United States Patent [19]

Sellars et al.

[11] 3,950,283

[45] Apr. 13, 1976

[54] MULTICOLOURED PAINTS FROM TWO OR MORE PIGMENTED AQUEOUS POLYMER EMULSIONS

[75] Inventors: Keith Sellars, Farnborough; Peter Laybourn, Sawbridgeworth, both of England

[73] Assignee: Harlow Chemical Company Limited, London, England

[22] Filed: July 9, 1971

[21] Appl. No.: 161,309

Related U.S. Application Data

[63] Continuation-in-part of Ser. No. 834,876, June 19, 1969, abandoned.

[30] Foreign Application Priority Data

Mar. 7, 1969 United Kingdom............. 12168/69

[52] U.S. Cl. ... 260/17 R; 106/193 P; 260/29.6 MP; 260/42.55
[51] Int. Cl.². ... C09D 5/02; C09D 3/80; C09D 3/74
[58] Field of Search........ 260/17 R, 29.6 MP, 41 A, 260/41 B, 42.55; 106/193

[56] References Cited
UNITED STATES PATENTS
3,458,328  7/1969  Zola...................................... 106/15

Primary Examiner—Lucille M. Phynes
Attorney, Agent, or Firm—Brisebois & Kruger

[57] ABSTRACT

A process for the production of a multicoloured paint which comprises admixing two or more differently coloured hydroxyethyl cellulose-containing aqueous polymer emulsions with a dispersion of a clay of the formula

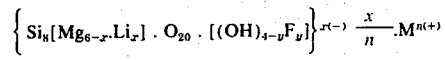

wherein $M$ is a cation, $x$ is a value greater than zero and less than 6, $y$ is from 1.00 up to but less than 4 and $n$ is an integer from 1 to 3, to form a multicoloured paint dispersion consisting of discrete coloured aqueous polymer emulsion particles as the disperse phases in an aqueous continuous phase of the clay dispersion.

11 Claims, No Drawings

MULTICOLOURED PAINTS FROM TWO OR MORE PIGMENTED AQUEOUS POLYMER EMULSIONS

This application is a continuation-in-part of our co-pending application Ser. No. 834,876, filed June 19, 1969, now abandoned.

This invention relates to paints, especially multicoloured paints.

Multicoloured paints, generally comprising two or more colours, are already commercially available. Hitherto proposed multicoloured paints have been made by dispersing nitrocellulose lacquers or other organic solvent based lacquers in water dispersible colloid solutions of, for example, methyl cellulose or by dispersing water-based paints in solvent-based solutions or dispersions. The lacquers contain hydrophobic solvents, for example, alkyl acetates and ketones, and the coloured phases are thus kept separate and the paints dry to give multicolour films.

Being based on volatile organic solvents, however, the hitherto proposed multicoloured paints have a number of serious disadvantages. First of all, they have a low flash point and are subject to the safety regulations applicable to cellulose materials, which impose severe restrictions on their carriage, storage and use. Secondly, they have an unpleasant smell which can remain for several days after painting.

It is an object of the present invention to avoid the above disadvantages and to provide useful multicoloured paints based solely on aqueous film-forming polymer emulsions.

It is a further object of the present invention to provide a process for the production of a multicoloured paint which comprises causing at least two differently coloured or pigmented aqueous film-forming polymer emulsions to gel and, if necessary, comminuting the coloured or pigmented gels so formed, to produce a dispersion.

Another object of the present invention is to provide a process for the production of a multicoloured paint, which comprises mixing at least two aqueous film-forming polymer emulsions stabilized by a protective colloid with an aqueous solution of a substance which will react with the emulsions causing them to gel, and, if necessary, comminuting the gel so formed, thus producing an aqueous dispersion containing particles derived from the coloured emulsions as the disperse phases.

Working within the concept of an all-aqueous multicoloured paint we have found that a specific interaction gives paints of excellent stability which give coatings of outstanding definition as regards the individual colours even after long storage periods. The specific insolubilizing interaction which we have discovered and utilised in the present invention is that between hydroxyethyl cellulose and a clay of the formula

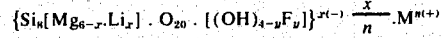

in which $M$ is a cation, $x$ is a value greater than zero and less than 6, $y$ is from 1.0 up to but less than 4 and $n$ is an integer from 1 to 3.

According to the present invention, therefore, there is provided a process for the production of a multicolour paint, which comprises mixing at least two aqueous coloured hydroxyethyl cellulose-containing emulsions with a dispersion of a clay of the above formula so that the clay dispersion forms the outer or continuous phase and the coloured emulsions form the inner or discontinuous phases, and, if necessary, comminuting the coloured particles so formed to produce a dispersion.

Clays of the above formula are described in British Pat. Nos. 1,054,111 and 1,155,595. They are synthetic swelling, generally hydrophilic, clays having the form of free-flowing white powders. They are commercially available from Laporte Industries Limited under the trade name LAPONITE. $M$ is preferably sodium in which case $n$ is equal to 1. The clay dispersion sold as LAPONITE S is especially preferred for use in the present invention. This has the specific dry weight analysis: $SiO_2$ 55.9%, $MgO$ 26.7%, $Li_2O$ 1.9%, F 8.3%, $Na_2O$ 4.3%, $Fe_2O_3$ 0.04%, $CaO$ 0.10%, $SO_3$ 0.05%, $CO_2$ 0.24%, structural $H_2O$ 3.6%.

The clay dispersion advantageously contains one or more wetting agents, especially anionic polyphosphate surfactants such as "Calgon" and "Tetron" which reduce the viscosity of the dispersion and reduce the tendency of the dispersion to thicken and set on standing.

For convenience only the aqueous vehicle containing the clay and which forms the continuous phase in the final paint is referred to throughout this specification as a dispersion. However, this is not intended to imply that the vehicle has any particular physical structure. Other terms, e.g. solution or sol, may in some cases be a more accurate physical description.

The hydroxyethyl cellulose is preferably present as a high viscosity solution, for example that sold commercially as Natrosol 250 HHR. The coloured emulsions used as starting materials may be stabilised by protective colloids. If the protective colloid is itself hydroxyethyl cellulose it will nevertheless be preferable to add excess of this substance for reaction with the clay.

It will be appreciated that the amounts of the various constituents of the multicoloured paint dispersions may be broadly varied within the framework of the present invention depending on the specific materials employed and, in particular, on the overall effect desired. Thus, although in general the outer or continuous phase preferably contains at least 0.5% by weight of the clay expressed as a percentage of the total weight of the paint lower amounts may be used in some cases.

Similarly the hydroxyethyl cellulose-containing emulsions used as starting materials advantageously comprise from 5 to 45%, preferably from 15 to 30%, by weight of pigments (including extenders), from 0.2 to 1.7% by weight of hydroxyethyl cellulose (corresponding to from 10 to 85% by weight of a 2% solution of the hydroxyethyl cellulose) and from 5 to 25% by weight of polymer (corresponding to from 10 to 50% by weight of a 50% solids polymer dispersion), but emulsions falling outside the above range can equally well be used. Obviously, given the basic inventive idea of utilising the hydroxyethyl cellulose/clay interaction one skilled in the art will be able to vary his compositions according to the specific materials at hand and the effect he desires.

It is to be understood that the term "emulsion" as used in this specification includes compounded emulsions, for example commercially available emulsion paints may be used as starting materials. Any of the polymer emulsions hitherto known in the art may be used. Such film-forming polymers are derived from one or more ethylenically unsaturated monomers. Typical examples of suitable materials include vinyl acetate homo- and co-polymers, e.g. polyvinyl acetate and vinyl acetate/vinyl chloride co-polymers, pure acrylics e.g. acrylic ester homo- and co-polymers, polystyrene, styrene/butadiene copolymers and acrylonitrile/butadiene copolymers. In many cases it will be advantageous to add a further film-forming polymer binder to the paints produced by the present invention. The binder is preferably added in an amount of up to 20% by weight based on the total weight, preferably up to 10%, and may be colourless, or if desired, coloured. It should preferably not affect, or be affected by, the hydroxyethyl cellulose/clay system. The addition of such a binder improves the drying speed, the sheen control, the washability, durability and water resistance of the final coating. Any of the film-forming polymers common in the art may be used, e.g. those derived from one or more ethylenically unsaturated monomers. All of the polymers specifically referred to above may conveniently be used.

When the emulsions and the clay dispersion are admixed in the process of the invention, large stable flecks are formed, which may be comminuted, if necessary by, for example, the use of a stirrer. Alternatively, one of the components can be introduced into the other by spraying.

Advantageously, the emulsion containing the hydroxyethyl cellulose is added to the dispersion of the clay, for example, two or more differently coloured emulsions are added, preferably successively, to the clay dispersion producing flecks of different colours which may, if necessary, be comminuted by stirring. Alternatively the emulsions may be sprayed into the clay solution to produce fine particles.

It is preferable for any stirring to be carried out at low shear rates, preferably less than 100 rpm, to avoid undesired incorporation of the outer continuous clay-containing phase into the inner discontinuous cellulose ether-containing phase.

A further stabilizer is preferably added to the outer or continuous phase. This may be a water soluble colloid solution, preferably a cellulose ether such as sodium carboxymethyl cellulose, which minimises destabilization of the flecks and thickening of the paint on storage. The amount of stabilizer may vary between 0.1% and 0.5% by weight of the paint but is preferably about 0.25%.

The dispersion obtained by the process of the present invention, preferably containing a further film-forming binder, may be applied to a surface by spraying and will dry by loss of water to give a continuous multicoloured film.

The paints of the present invention may include the usual additives such, for example, as extenders and fungicides.

An important advantage of the process of the present invention is that the polymer emulsions which form the disperse phases may be coloured using anionic or nonionic pigment dispersions, for example, Colanyl dispersions, without bleeding of colour from the particles produced. It has been found that the clay effectively fixes the colours and keeps them separate.

When relatively large foreground flecks are required which must be resistant to breakdown during spraying it is advantageous to make the viscosity of the background-forming emulsion lower than that of the coloured fleck-forming polymer emulsion. Thus the background-forming emulsion will preferably contain 15 to 25% by weight of a 2% hydroxyethyl cellulose solution and the coloured fleck-forming emulsion will contain from 60 to 80% by weight of the solution.

The followng Examples illustrate the invention but are not intended to limit it thereto, all parts and percentages being by weight.

EXAMPLE 1

A basic white emulsion paint consisting of

| | |
|---|---|
| Tioxide RCR-2, a white titanium dioxide pigment | 25.00 |
| 2% Natrosol 250 HHR, a high viscosity hydroxyethyl cellulose | 18.75 |
| Revacryl 1A, a colloidally stabilized pure acrylic (2-ethyl hexyl acrylate/methyl methacrylate copolymer) emulsion 51% solids | 25.00 |
| Water | 31.25 | was manufactured on standard equipment in the usual manner.

Red and blue emulsions were then prepared by tinting emulsions of the above composition with a red and a blue Colanyl dyestuff, respectively.

A three-colour paint of the composition

| | |
|---|---|
| 25% LAPONITE S solution | 17.00 |
| 5% Tetron solution (tetra sodium pyrophosphate wetting agent) | 6.75 |
| White emulsion paint | 67.75 |
| Red emulsion paint | 4.25 |
| Blue emulsion paint | 4.25 | was then prepared as follows:

The LAPONITE S and Tetron solutions were blended together and the white emulsion was added with very slow stirring (50 r.p.m.). The red and blue emulsions were then added in succession and stirring was continued until the desired particle size had been obtained.

Then 10 parts by weight of Revacryl 1A were added as a further stabilizer and binder.

The paint so obtained was then sprayed onto a wall. It gave a surface consisting of a white background having red and blue flecks.

EXAMPLE 2

A basic white emulsion paint consisting of

| | |
|---|---|
| Tioxide RCR-2 | 5.00 |
| 2% Natrosol 250 HHR | 80.00 |
| Revacryl 1A | 15.00 | was made in the usual manner and tinted green using a Colanyl pigment.

A multicolour paint consisting of

| | |
|---|---|
| 15% LAPONITE S | 20.00 |
| 5% Tetron | 5.00 |
| White paint (as in Example 1) | 50.00 |
| Green paint | 10.00 |
| Water | 15.00 | was then prepared as follows:

The LAPONITE S and Tetron solutions were blended together and the white emulsion described in Example 1 (comprising 18.75 parts of 2% Natrosol 250 HHR) was added with very slow stirring. The green emulsion paint prepared as described above was then added and slow stirring (50 r.p.m.) was continued to produce the desired particle size.

10 Parts of Revacryl 1A were then added as stabilizer.

The paint gave a white background with green flecks when sprayed onto a test surface.

EXAMPLE 3

A basic white emulsion paint was manufactured as in Example 1. A yellow emulsion paint was then made by tinting part of this with a yellow Colanyl dispersion.

A multicolour paint of the following composition.

| | |
|---|---|
| 15% LAPONITE S solution | 10.00 |
| 5% Tetron solution | 5.00 |
| White paint | 62.00 |
| Yellow paint | 3.00 |
| 3% Cellofas B600 soln. (sodium carboxymethyl cellulose | 8.00 |
| Water | 12.00 | was prepared as follows:

The LAPONITE S and Tetron solutions were blended and the white emulsion was added with very slow stirring. The yellow emulsion paint prepared as described above was then added and slow stirring (50 r.p.m.) was continued to produce the desired particle size. The Cellofas solution and water were added and blended into the paint with slow stirring. Finally 10 parts of Revacryl 1A were added to increase the water resistance.

EXAMPLE 4

An emulsion paint to the following formulation was manufactured:

| | |
|---|---|
| Tioxide RCR 2 | 10.00 |
| Barytes, natural barium sulphate extender | 7.00 |
| Whiting, natural calcium carbonate extender | 5.00 |
| 2% Natrosol 250 HHR | 29.00 |
| 5% Tetron solution | 10.00 |
| .88 Ammonia | 0.25 |
| Revacryl 105, surfactant-stabilised pure acrylic (methyl methacrylate/2-ethyl hexyl acrylate) emulsion 50% solids | 38.75 |

Half of this paint was then tinted blue using a Colanyl pigment.

A multicoloured paint consisting of

| | |
|---|---|
| 10% LAPONITE S solution | 25.00 |
| 5% Tetron solution | 7.5 |
| 3% Cellofas B 50 solution (sodium carboxymethyl cellulose) | 3.0 |
| White emulsion paint | 25.00 |
| Blue emulsion paint | 25.00 |
| Water | 14.5 | was manufactured as follows: The Tetron solution, Cellofas B 50 solution and water were blended together. The LAPONITE S solution was then added and the mixture was stirred until a smooth dispersion was obtained. The white emulsion paint and the blue emulsion paint were added in turn with slow stirring. Stirring was continued until the desired particle size was achieved. The paint was sprayed onto a test surface and gave a blue and white flecked appearance.

EXAMPLE 5

An emulsion paint was manufactured as in Example 4. Separate portions of the paint were tinted red and yellow.

A multicoloured paint consisting of:

| | |
|---|---|
| 10% LAPONITE S solution | 20.00 |
| 5% Tetron solution | 12.5 |
| Revacryl 215 (surfactant-stabilised pure acrylic emulsion 51% solids) | 12.5 |
| Red emulsion paint | 25.00 |
| Yellow emulsion paint | 25.00 |
| Water | 5.00 | was manufactured as follows: Revacryl 215, LAPONITE S solution, Tetron solution and water were blended with slow stirring. The red and yellow emulsion paints were added in turn and stirring continued until the desired fleck size was reached. The paint was sprayed onto a test surface and dried to give a red and yellow flecked film.

EXAMPLE 6

A basic white emulsion paint was prepared as described in Example 2 except that Mowilith D 025, a polyvinyl alcohol stabilised vinyl acetate homopolymer emulsion containing dibutyl phthalate as plasticizer, was used instead of Revacryl 1A. This was used to make a green and white multicoloured paint by the method described in Example 2, 15 parts of Revacryl 105 being added to give extra water resistance. On spraying the paint onto a test surface a similar effect was obtained as in Example 2.

EXAMPLE 7

A basic white emulsion paint was prepared as described in Example 2 except that Mowilith DM 10, a surfactant stabilised ethylene/vinyl acetate copolymer emulsion, was used instead of Revacryl 1A. This was used to make a multicoloured paint as described in Example 2, 15 parts of Revacryl 1A being added to give extra water resistance. Again the coating obtained on the test surface was similar to that obtained in Example 2.

EXAMPLE 8

A multicoloured paint was prepared exactly as described in Example 4 except that Revacryl 144, a surfactant stabilised styrene/2-ethyl hexyl acrylate copolymer emulsion was used in place of Revacryl 105. The multicoloured paint obtained had excellent water resistance.

We claim:

1. A process for the preparation of a multicoloured paint which comprises mixing and gelling (a) at least two differently coloured pigmented aqueous film-forming polymer paint emulsions, each of said emulsions additionally containing hydroxyethyl cellulose, with (b) an aqueous dispersion of a clay of the formula

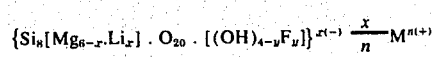

wherein M is a cation, $x$ is a value greater than zero and less than 6, $y$ is from 1.00 up to but less than 4 and $n$ is an integer from 1 to 3, to produce a multicoloured paint dispersion comprising discrete differently coloured aqueous polymer emulsion particles as the disperse phases in an aqueous continuous phase of the clay dispersion.

2. The process of claim 1, wherein the clay has the specific dry weight analysis: $SiO_2$ 55.9%, $MgO$ 26.7%, $Li_2O$ 1.9%, $F$ 8.3%, $Na_2O$ 4.3%, $Fe_2O_3$ 0.04%, $CaO$ 0.10%, $SO_3$ 0.05%, $CO_2$ 0.24%, structural $H_2O$ 3.6%.

3. The process of claim 1, wherein the clay dispersion contains a polyphosphate surfactant.

4. The process of claim 1, wherein up to 20% by weight of a film-forming polymer emulsion, said polymer being derived from one or more ethylenically unsaturated monomers, is added as binder to the multicoloured paint dispersion.

5. The process of claim 1, wherein from 0.1 to 0.5% by weight of a water-soluble colloid solution is added as stabilizer to the multicoloured paint dispersion.

6. A process for the production of a multicoloured paint which comprises compounding at least two differently coloured pigmented aqueous film-forming polymer emulsions each comprising from 5 to 45% by weight of pigments, from 0.2 to 1.7% by weight of hydroxyethyl cellulose and from 5 to 25% by weight of a polymer derived from one or more ethylenically unsaturated monomers and stirring said emulsions successively into an aqueous dispersion of a clay having the following specific dry weight analysis: $SiO_2$ 55.9%, $MgO$ 26.7%, $Li_2O$ 1.9%, $F$ 8.3%, $Na_2O$ 4.3%, $Fe_2O_3$ 0.04%, $CaO$ 0.10%, $SO_3$ 0.05%, $CO_2$ 0.24%, structural $H_2O$ 3.6%, at a stirring rate of less than 100 r.p.m. to produce a multicoloured paint dispersion.

7. A multicoloured paint comprising a dispersion of (a) colouring amounts of at least two discrete differently coloured disperse phases consisting of aqueous particles derived from at least two differently coloured hydroxyethyl cellulose-containing aqueous film-forming polymer paint emulsions, each of said film-forming polymers being derived from one or more ethylenically unsaturated monomers, (b) in an aqueous continuous phase dispersion of a clay of the formula

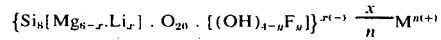

wherein M is a cation, $x$ is a value greater than zero and less than 6, $y$ is from 1.00 up to but less than 4 and $n$ is an integer from 1 to 3.

8. The multicoloured paint of claim 7, the continuous phase of which contains up to 20% by weight of a film-forming polymer derived from one or more ethylenically unsaturated monomers.

9. The multicoloured paint of claim 7, the continuous phase of which contains from 0.1 to 0.5% by weight of a water-soluble colloid as stabilizer.

10. A multicoloured paint comprising at least two discrete differently coloured disperse phases each consisting of aqueous particles containing from 5 to 45% by weight of pigments, from 0.2 to 1.7% by weight of hydroxyethyl cellulose and from 5 to 25% by weight of a film-forming polymer derived from one or more ethylenically unsaturated monomers, the disperse phases being dispersed in an aqueous continuous phase comprising an aqueous dispersion of at least 0.5% by weight of the paint of a clay of the specific dry weight analysis: $SiO_2$ 55.9%, $MgO$ 26.7%, $Li_2O$ 1.9%, $F$ 8.3%, $Na_2O$ 4.3%, $Fe_2O_3$ 0.04%, $CaO$ 0.10%, $SO_3$ 0.05%, $CO_2$ 0.24%, structural $H_2O$ 3.6%.

11. The process of claim 1 with the step of comminuting the gelled pigmented polymer emulsion particles.

* * * * *